US012737613B2

(12) United States Patent
Vadera et al.

(10) Patent No.: US 12,737,613 B2
(45) Date of Patent: Sep. 15, 2026

(54) POST-HOC LOSS-CALIBRATION FOR BAYESIAN NEURAL NETWORKS

(71) Applicant: International Business Machines Corporation, Armonk, NY (US)

(72) Inventors: Meet Prakash Vadera, Northampton, MA (US); Uri Kartoun, Cambridge, MA (US); Soumya Ghosh, Boston, MA (US); Kenney Ng, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 17/345,099

(22) Filed: Jun. 11, 2021

(65) Prior Publication Data

US 2022/0405570 A1 Dec. 22, 2022

(51) Int. Cl.
*G06N 7/01* (2023.01)
*G06N 3/045* (2023.01)
*G06N 3/047* (2023.01)
*G06N 3/08* (2023.01)
*G06N 3/084* (2023.01)
(Continued)

(52) U.S. Cl.
CPC ............... *G06N 3/08* (2013.01); *G06N 3/045* (2023.01); *G06N 7/01* (2023.01)

(58) Field of Classification Search
CPC ............. G06N 3/08; G06N 7/01; G06N 3/045
See application file for complete search history.

(56) References Cited

U.S. PATENT DOCUMENTS 8,688,603 B1 4/2014 Kurup
8,909,564 B1 12/2014 Kaplow
(Continued)

FOREIGN PATENT DOCUMENTS

WO 2020109074 A1 6/2020

OTHER PUBLICATIONS

Cui et al., "Accelerating Monte Carlo Bayesian Prediction via Approximating Predictive Uncertainty Over the Simplex," Dec. 23, 2020, IEEE Transactions on Neural Networks and Learning Systems, vol. 33, No. 4, pp. 1492-1506 (Year: 2020).*
(Continued)

*Primary Examiner* — Kamran Afshar
*Assistant Examiner* — Steven Phung
(74) *Attorney, Agent, or Firm* — James L. Olsen

(57) ABSTRACT

A computing device and computer-implemented method for post-hoc correction of a decision generated by a machine learning model. The computing device accesses a trained first machine learning (ML) model, a dataset, and a utility function. The computing device trains a second ML model based on performing post-hoc correction of a first set of decisions generated by the first ML model on the dataset. The training includes processing the first set of decisions with respect to a second set of decisions made by the second ML model on the dataset. The training further includes configuring, based on the processing, the second ML model with parameters from a set of parameters optimizing a loss-objective function that concurrently maximizes utility of the second set of decisions according to the utility function and a log-likelihood on the dataset. After training, the second ML model is outputted as a loss-calibrated ML model.

15 Claims, 5 Drawing Sheets

(51) Int. Cl.
*G06N 3/088* (2023.01)
*G06N 5/01* (2023.01)

(56) References Cited

U.S. PATENT DOCUMENTS

| | | | | |
|---|---|---|---|---|
| 10,438,114 | B1 * | 10/2019 | Blundell | G06N 3/047 |
| 11,113,632 | B1 * | 9/2021 | Evans | G06N 3/088 |
| 11,468,262 | B2 * | 10/2022 | Cheng | G06N 3/045 |
| 2017/0053646 | A1 * | 2/2017 | Watanabe | G06N 3/045 |
| 2017/0300605 | A1 * | 10/2017 | Ardis | G05B 23/024 |
| 2019/0098039 | A1 * | 3/2019 | Gates | G16H 20/70 |
| 2020/0134493 | A1 | 4/2020 | Bhide | |
| 2020/0210893 | A1 * | 7/2020 | Harada | G06N 7/01 |
| 2020/0334569 | A1 | 10/2020 | Moghadam | |
| 2020/0356905 | A1 | 11/2020 | Luk | |
| 2020/0380310 | A1 | 12/2020 | Weider | |
| 2021/0034976 | A1 * | 2/2021 | Arik | G06N 3/04 |
| 2021/0202070 | A1 * | 7/2021 | Bannae | G16H 30/20 |
| 2021/0326664 | A1 * | 10/2021 | Dasgupta | G06N 20/20 |

OTHER PUBLICATIONS

Kuśmierczyk et al., "Correcting Predictions for Approximate Bayesian Inference", Apr. 3, 2020, Proceedings of the AAAI Conference on Artificial Intelligence, 34(04), 4511-4518. https://doi.org/10.1609/aaai.v34i04.5879 (Year: 2020).*

Cobb et al., "Loss-Calibrated Approximate Inference in Bayesian Neural Networks", arXiv:1805.03901v1 [stat.ML], May 10, 2018, 12 pages.

Kusmierczyk et al., "Correcting Predictions for Approximate Bayesian Inference", arXiv:1909.04919v1 [stat.ML], Sep. 11, 2019, 12 pages.

Lacoste-Julien et al., "Approximate inference for the loss-calibrated Bayesian", Appearing in Proceedings of the 14th International Conference on Artifcial Intelligence and Statistics (AISTATS), 2011, 09 pages.

* cited by examiner

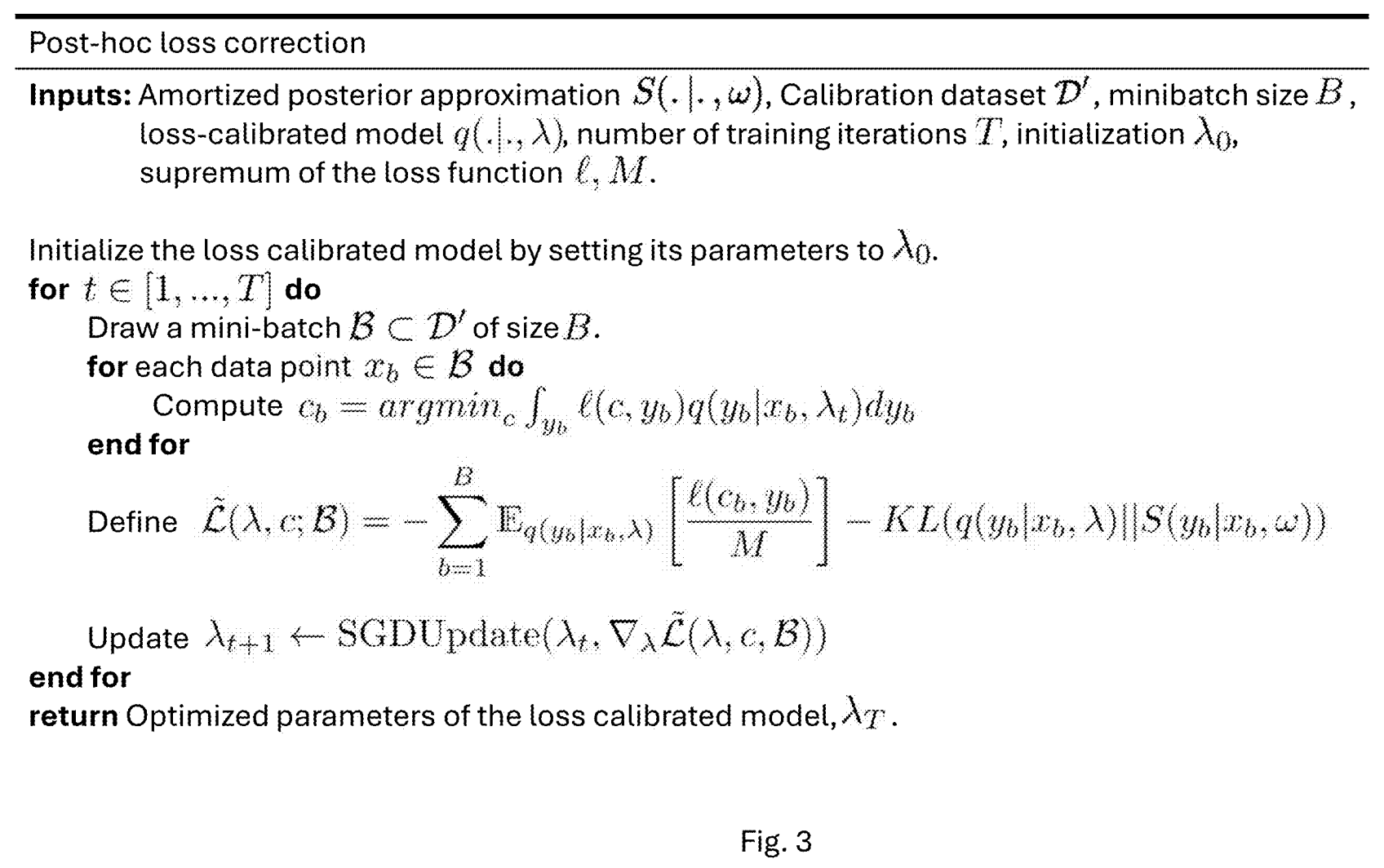

Post-hoc loss correction

Inputs: Amortized posterior approximation $S(.|.,\omega)$, Calibration dataset $\mathcal{D}'$, minibatch size $B$, loss-calibrated model $q(.|.,\lambda)$, number of training iterations $T$, initialization $\lambda_0$, supremum of the loss function $\ell$, $M$.

Initialize the loss calibrated model by setting its parameters to $\lambda_0$.
for $t \in [1, ..., T]$ do
  Draw a mini-batch $\mathcal{B} \subset \mathcal{D}'$ of size $B$.
  for each data point $x_b \in \mathcal{B}$ do
    Compute $c_b = argmin_c \int_{y_b} \ell(c, y_b) q(y_b|x_b, \lambda_t) dy_b$
  end for
  Define $\tilde{\mathcal{L}}(\lambda, c; \mathcal{B}) = -\sum_{b=1}^{B} \mathbb{E}_{q(y_b|x_b,\lambda)} \left[ \frac{\ell(c_b, y_b)}{M} \right] - KL(q(y_b|x_b, \lambda) || S(y_b|x_b, \omega))$ Update $\lambda_{t+1} \leftarrow \mathrm{SGDUpdate}(\lambda_t, \nabla_\lambda \tilde{\mathcal{L}}(\lambda, c, \mathcal{B}))$
end for
return Optimized parameters of the loss calibrated model, $\lambda_T$.

Fig. 3

POST-HOC LOSS-CALIBRATION FOR BAYESIAN NEURAL NETWORKS

BACKGROUND

The present invention generally relates to machine learning and more particularly relates to post-hoc loss-calibration of machine learning systems implementing Bayesian neural networks.

Machine learning is generally directed to technology or techniques that enable a computing system to learn from data and improve decision/prediction accuracy over time without being programmed to do so. In machine learning, a computing system is trained to find patterns and features in massive amounts of data to make decisions or predictions based on new data. For example, machine learning systems typically build a model based on sample/training data to make decisions/predictions based on input data sets. The model is continuously and autonomously improved based on subsequent decisions/predictions.

Decision making in machine learning is typically composed of data, predictions, judgments, and actions. Uncertainty, generally defined as incomplete or imperfect information, can be introduced at each of these components or stages, resulting in poor or inaccurate decisions. Decision-making under uncertainty is a frequently encountered challenge across diverse applications, such as medical diagnosis, hazard alarms, and autonomous driving. Based on Bayesian decision theory (BDT), machine learning models, such as Bayesian neural networks, provide an elegant framework for decision-making under uncertainty. For example, given the Bayes posterior, a set of decisions, and a utility function that encodes user preferences, BDT dictates that the decision that maximizes the expected utility, where the expectation is with respect to the Bayes posterior, is optimal. While promising, the optimality guarantees provided by BDT only hold when the true Bayes posterior is available.

SUMMARY

In one aspect, a method of using a computing device for post-hoc correction of a decision generated by a machine learning model includes accessing, by the computing device, a trained first machine learning (ML) model, a dataset, and a utility function over a prescribed set of actions. The computing device trains a second ML model based on performing post-hoc correction of a first set of decisions generated by the first ML model on the dataset. Training of the second ML model includes processing the first set of decisions with respect to a second set of decisions made by the second ML model on the dataset. Training of the second ML model also includes configuring, based on the processing, the second ML model with parameters from a set of parameters optimizing a loss-objective function that concurrently maximizes utility of the second set of decisions according to the utility function and a log-likelihood on the dataset. The computer device outputs the second ML model as a loss-calibrated ML model.

In another aspect, an information processing system for post-hoc correction of a decision generated by a machine learning model includes memory, a processor communicatively coupled to the memory, and a loss-calibration module communicatively coupled to the memory and the processor. The loss-calibration module is to access a trained first machine learning (ML) model, a dataset, and a utility function over a prescribed set of actions. The loss-calibration module is further to train a second ML model based on performing post-hoc correction of a first set of decisions generated by the first ML model on the dataset. Training of the second ML model includes processing the first set of decisions with respect to a second set of decisions made by the second ML model on the dataset. Training of the second ML model also includes configuring, based on the processing, the second ML model with parameters from a set of parameters optimizing a loss-objective function that concurrently maximizes utility of the second set of decisions according to the utility function and a log-likelihood on the dataset. The loss-calibration module is to output the second ML model as a loss-calibrated ML model.

In yet a further aspect, a computer program product for post-hoc correction of a decision generated by a machine learning model includes a computer-readable storage medium having program instructions embodied thereon. The program instructions executable by a computing device to cause the computing device to access a trained first machine learning (ML) model, a dataset, and a utility function over a prescribed set of actions. The program instructions further cause the computing device to train a second ML model based on performing post-hoc correction of a first set of decisions generated by the first ML model on the dataset. Training of the second ML model includes processing the first set of decisions with respect to a second set of decisions made by the second ML model on the dataset. Training of the second ML model also includes configuring, based on the processing, the second ML model with parameters from a set of parameters optimizing a loss-objective function that concurrently maximizes utility of the second set of decisions according to the utility function and a log-likelihood on the dataset. The program instructions further cause the computing device to output the second ML model as a loss-calibrated ML model.

BRIEF DESCRIPTION OF THE DRAWINGS

In the accompanying figures, like reference numerals refer to identical or functionally similar elements throughout the separate views. The accompanying figures, together with the detailed description below, are incorporated in and form part of the specification and serve to further illustrate various embodiments and to explain various principles and advantages, all in accordance with the various embodiments, in which:

FIG. 3 shows one example of pseudo-code for loss-calibration techniques performed by the machine learning model loss-calibration system in accordance with at least some embodiments.

DETAILED DESCRIPTION

Figure 1:
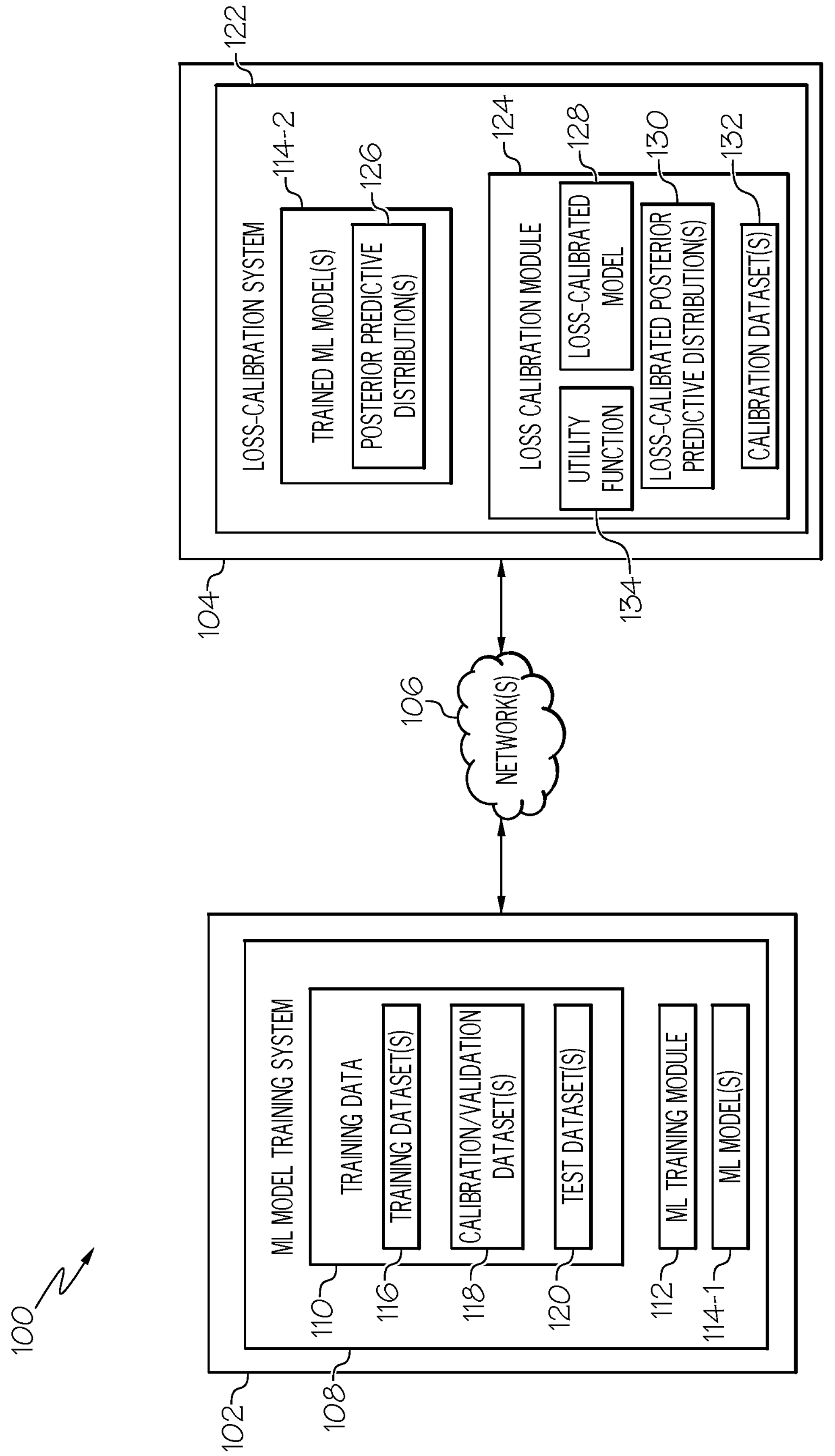
FIG. 1 is a diagram of the overall operating environment for a machine learning model loss-calibration system in accordance with at least some embodiments.

This application includes references denoted in brackets, i.e., [ ]. These references are listed in the information disclosure statement (IDS) filed herewith. The teachings of each of these references are hereby incorporated hereinto in their entirety.

Overview

Inspired in part by the success of deep learning, modern Bayesian models for machine learning are often high-dimensional, not restricted to conjugate prior-likelihood families, and almost always have intractable posterior distributions. Bayesian neural networks (BNNs) are one example of such models implemented by machine learning systems. BNNs can generally be defined as a stochastic artificial neural network trained using Bayesian inference. As such, a BNN typically includes at least one input layer, a number of hidden layers, and an output layer. In general, the input layer feeds data values into the next layer, such as a hidden layer, that creates decisions/predictions based on the input received by this layer. If multiple hidden layers are implemented, the current hidden layer passes its predictions to the next hidden layer. The output layer collects the decisions/predictions made by the last hidden layer and generates the BNN's final decision/prediction. During the prediction phase(s), the BNN predictions and uncertainty intervals around the predictions. The BNN also generates the distribution of the parameters that it has learned from the observations.

In BNNs, various (and at times rudimentary) surrogates are employed to approximate the posterior inference due to lacking tractable posterior distributions. Decisions that maximize the expected utility, with the expectation computed with respect to the surrogate rather than the true posterior inference, are not guaranteed to be optimal. This observation has engendered research into loss-calibrated inference techniques [23, 9, 22] that modify the approximate inference procedures to prefer regions of the posterior inference, most relevant to the decision-making task at hand. However, these methods intricately couple posterior inference with decision-making in machine learning, which poses several difficulties. For example, any change in the utility function necessitates re-computing the loss-calibrated posterior inference. Approximate inference algorithms are typically computationally expensive, and such re-computations can be computationally onerous. Moreover, updating the posterior inference on account of a modified utility function rather than updated prior beliefs or data is conceptually unappealing. Furthermore, under the loss-calibrated inference framework, every posterior inference algorithm typically requires a bespoke loss-calibrated counterpart to be developed. Such loss-calibrated variants may be challenging to develop, and no obvious counterpart may exist for implementation.

As described in greater detail below, one or more embodiments provide systems and methods that employ techniques for post-hoc loss-calibration of BNNs in machine learning systems. In at least some embodiments, the loss-calibration techniques include performing post-hoc correction of the posterior predictive distributions generated by the BNN of a machine learning system. By correcting predictions, the loss-calibration techniques described herein are able to decouple posterior inference from the process of correcting decisions. As a result, the loss-calibration techniques are agnostic to the choice of the inference operations implemented by a machine learning system. Stated differently, any set of inference operations can be used by the machine learning system without affecting the loss-calibration techniques of one or more embodiments. Also, given a posterior approximation and unlabeled calibration data, the loss-calibration techniques do not need access to the original training data used by the machine learning system. In combination, these properties significantly expand the applicability of loss-calibrated inference techniques.

In at least some embodiments, a single neural network is used to parameterize the posterior predictive corrections. At test time, decision-making involves a single forward pass through the network. The single forward pass provides significant speed-ups over alternate loss-calibrated techniques [9] that require expensive Monte Carlo approximations. The loss-calibration techniques described herein have been empirically demonstrated to support applications that require real-time decisions. Also, the loss-calibration techniques are configured to learn the post-hoc corrections efficiently. Since the corrections do not involve any posterior inference, the techniques are inexpensively adaptable to changing utility functions. The aforementioned conceptual and computational benefits do not come at the expense of empirical performance and the loss-calibration techniques.

Bayesian Neural Networks

The following is an overview of BNNs and Bayesian decision theory, which are applicable to one or more techniques described herein. Let $p(y|x,\theta)$ represent the probability distribution induced by a deep neural network classifier over classes $y\in Y=\{1, \ldots, C\}$ given feature vectors $x\in \mathbb{R}^D$. Given training data $D=\{(x_i,y_i)|\le i\le N\}$, BNNs are commonly learned through maximum conditional likelihood maximization. Instead of attempting to find the single (locally) optimal set of parameters $\theta_*$, BNNs are learned by inferring a posterior distribution $p(\theta|D,\theta^0)$ over the unknown parameters $\theta$ given the prior $p(\theta|\theta^0)$ with hyper-parameters $\theta^0$. Predictions y on unseen data points $x_*$ are made via the posterior predictive distribution, which involves averaging over the uncertainty in the posterior distribution:

$$p(y_* | x_*, D, \theta^0) = \int p(y_* | x_*, \theta)p(\theta | D, \theta^0)d\theta. \quad \text{(EQ 1)}$$

Applying Bayesian inference to neural networks is challenging because both the posterior and the posterior-predictive distributions are intractable to compute and require approximations. Various approximate inference algorithms have been used to approximate the intractable posterior, including variational inference (VI) [17] and Markov Chain Monte Carlo (MCMC) methods [30, 36]. In VI, an auxiliary distribution $q_\phi(\theta)$ is defined to approximate the true parameter posterior $p(\theta|D,\theta^0)$. The variational parameters $\phi$ are selected to minimize the Kullback-Leibler (KL) divergence between $q_\phi(\theta)$ and $p(\theta|D,\theta^0)$. Many VI approaches, such as those described in [16, 12, 15], and assumed density filtering (ADF) approaches, such as those described in [28, 26, 14], typically result in biased posterior estimates for complex posterior distributions. MCMC methods, on the other hand, provide sampling-based posterior approximations that are unbiased but are often computationally more expensive to use. MCMC methods allow for drawing a correlated sequence of samples $\theta_t\sim p(\theta|D,\theta^0)$ from the parameter posterior. The samples can then be used to approximate the posterior predictive distribution as a Monte Carlo average as shown in equation EQ 2:

$$p(y|x, D, \theta^0) \approx \frac{1}{T}\sum_{t=1}^{T} p(y|x, \theta_t), \theta_t\sim p(\theta|D, \theta^0). \quad \text{(EQ 2)}$$

Although Hamiltonian Monte Carlo [30] is very useful for inference in BNNs, its stochastic gradient variants [36, 8] are also useful for large networks and implemented by one or more embodiments described herein.

Bayesian decision theory provides a framework for decision-making under uncertainty [4]. Under the framework, a utility function u(h,y) can be elicited, where h denotes a decision within a set of possible actions A, and y denotes model predictions. Next, given a data point $x_*$, the expected utility (also known as the conditional gain), $G(h=c|x_*)$, is evaluated for all $h \in A$ using the utility function $u(\cdot)$ and the posterior predictive distribution $p(y_*|x_*,\theta,D)$:

$$G(h \mid x_*) = \int_{y_*} u(c, y_*) p(y_* \mid x_*, D, \theta^0) dy_*. \quad \text{(EQ 3)}$$

Finally, the optimal decision $\hat{h}$ is selected, such that it maximizes the conditional gain, $\hat{h} = \arg\max_{h \in A} G(h|x_*)$. However, an important assumption in this framework is that access is available to the true posterior predictive distribution. As described above, the true posterior predictive distribution is intractable for BNNs. Rather, in practice, access is only available to a crude approximation $\tilde{p}(y_*|x_*,D,\theta^0)$. Using this approximation as a drop-in replacement to $p(y_*|x_*,D,\theta^0)$ in EQ 3 no longer guarantees optimality of decisions, $\hat{h}$.

The above observation has inspired research in loss-calibrated inference such as a variational approach [23] for Gaussian process classification that derives from lower-bounding the log-conditional gain. The variational approach presents an expectation-maximization (EM) technique with closed form updates to train the variational distribution, which alternates between sampling from the variational posterior and making optimal decisions under the variational posterior. The variational approach of [23] was extended to BNNs by [9] and derives an objective that is a cost-penalized version of the standard evidence lower-bound (ELBO). Both [23] and [9] only consider discrete values for the decisions h. These methods were generalized to continuous decisions by [22]. Beyond variational approximations, an importance sampling-based approach [1] encourages high utility decisions. Other approaches [21] attempt corrections to model predictions instead of correcting the posterior approximation. However, these approaches need to carefully regularize the corrections via expensive bootstrap re-sampling operations to prevent over-fitting and do not scale to large BNN models.

Operating Environment

FIG. 1 shows one example of an operating environment 100, according to one or more embodiments, for implementing post-hoc loss-calibration of output generated by machine learning systems trained using Bayesian inference. It should be understood that the operating environment 100 is not limited to the configuration shown in FIG. 1 and other configurations are applicable as well. In the example shown in FIG. 1, the operating environment 100 comprises a plurality of information processing systems 102, 104. Examples of information processing systems 102, 104 include servers, desktop computers, cloud-based computing systems, laptop/notebook computers, mobile device computing systems, tablet computing systems, vehicular or other object recognition systems, or various other types of computing systems or devices. Each of the information processing systems 102, 104 is communicatively coupled to one or more networks 106 comprising connections such as wire, wireless communication links, and/or fiber optic cables. For example, the network 106, in at least some embodiments, comprises wireless communication networks such as cellular and non-cellular networks (e.g., Wi-Fi networks), private networks, public networks such as the Internet, and the like.

In at least some embodiments, at least one of the information processing systems 102 comprises a machine learning (ML) model training system 108. The ML model training system 108 includes, for example, training data 110, an ML training module 112, and one or more ML models 114 (shown as 114-1). The training data 110, in at least some embodiments, is partitioned into training datasets 116, calibration/validation datasets 118, test datasets 120, or a combination thereof. The training datasets 116 include, for example, feature and output target configurations (input-output pair) and are used to initially fit the parameters of the ML model 114-1. The calibration/validation datasets 118 are used to fine-tune parameters of the fitted ML model 114-1. The test dataset 120 is used to evaluate the performance of the fully trained ML model 114-1.

In at least some embodiments, the ML model 114-1 implements a Bayesian neural network (BNN), which is a stochastic artificial neural network (ANN) trained using Bayesian inference. Design of the BNN includes, for example, the selection and implementation of an artificial neural network architecture and stochastic model, including the prior and possibly a variational posterior family. Various inference techniques can train the BNN, such as (but not limited to) Markov Chain Monte Carlo (MCMC) and variational inference techniques. Examples of MCMC techniques include Gibbs sampling, Metropolis hasting, Hamiltonian Monte Carlo, No-U-Turn (NUTS), stochastic gradient, restart cosign annealing stochastic gradient Langevin dynamics (RECAST), and so on. Examples of variational inference include stochastic variational inference (SVI), Bayes by backpropagation, probabilistic backpropagations, MC dropout, deep ensembles, Kronecker factored (KFAC), stochastic weight averaging Gaussian (SWAG), and so on. It should be understood that the techniques described herein are not limited to any particular inference technique for the training of and implementation by the ML model 114. Also, the ML model(s) 114-1 is trainable to generate different decisions or predictions on various types of data, such as digital images, video, text, speech, structure information, etc.

One or more additional information processing systems 104, in at least some embodiments, include a loss-calibration system 122 implementing a loss-calibration module 124. As used herein, a "system" refers to software, hardware, or a combination thereof capable of implementing the loss-calibration module 124 for performing one or more techniques described herein. It should be understood that although FIG. 1 shows the ML model training system 108 and the loss-calibration system 122 implemented on different information processing systems 102, 104, a single information processing system, in other embodiments, include both the ML model training system 108 and the loss-calibration system 122. Also, in at least some embodiments, the loss-calibration module 124 is implemented on a separate system from the system implementing the trained ML model 114-2. In other embodiments, components of one or more of the ML model training system 108 and the loss-calibration system 122 are distributed across multiple information processing systems.

In at some embodiments, the loss-calibration system 122 comprises one or more trained ML models (shown as 114-2) and the loss-calibration module 124. The trained ML model 114-2 is typically trained by the ML training module 112 to processes an input dataset(s) for generating one or more outputs, such as a posterior predictive distribution(s) 126, based thereon. For example, the trained ML model 114-2, upon accessing an input dataset, performs posterior inference by learning the posterior distribution over the network parameters, such as weights, given an input dataset. The trained ML model 114-2 then considers the output of the whole distribution of weight values to produce a distribution over the network outputs (i.e., a posterior predictive distribution 126). Stated differently, the trained ML model 114-2 uses the previously learned posterior distribution to compute a posterior predictive distribution 126 of the network outputs, given a certain input, which quantifies exactly the model's uncertainty. It should be understood that the posterior predictive distribution can be determined for other parameters as well. For example, the posterior predictive distribution, in other embodiments, is determined over the weights given the data and a fixed model, over predicted class labels given the data and model, over models given the data, over network outputs given the data that is not conditioned on a particular, a combination thereof, and so on.

A trained ML model 114-2 typically generates final decisions/predictions for the input dataset by summarizing the posterior predictive distribution 126. However, as described above, the trained ML model 114-2 implements approximate inference techniques since the posterior is often computationally intractable for Bayesian models. Approximating the posterior inference/distribution, in many instances, leads to sub-optimal posterior predictive distributions. Therefore, the loss-calibration module 124 performs loss-calibration operations on the posterior predictive distribution 126 generated by the trained ML model 114-2 for training a loss-calibrated model 128. The loss-calibrated model is trained to generate a loss-calibrated (corrected) posterior predictive distribution 130. It should be understood that the loss-calibration module 124 can perform loss-calibration operations on posterior predictive distributions 126 generated by trained ML model 114-2 during training or runtime (real-world) environments.

As described in greater detail below, the loss-calibration module 124 takes as input the (original) posterior predictive distributions(s) 126 generated by the trained ML model 114-2, a calibration data 132, and a user-defined utility function 134. The loss-calibration module 124 uses this input to train and configure the loss-calibrated model 128, which outputs a loss-calibrated (corrected) posterior predictive distribution 130. The loss-calibrated posterior predictive distribution 130 is then implemented by a runtime system or environment to generate final predictions/decisions associated with an input dataset(s). In one example, the final predictions/decisions are generated by performing statistical operations on the loss-calibrated posterior predictive distribution 130 using, for example, Monte-Carlo or other applicable operations. This summary of the loss-calibrated posterior predictive distribution 130 is outputted as the final predictions/decisions of the loss-calibrated model 128.

Figure 2:
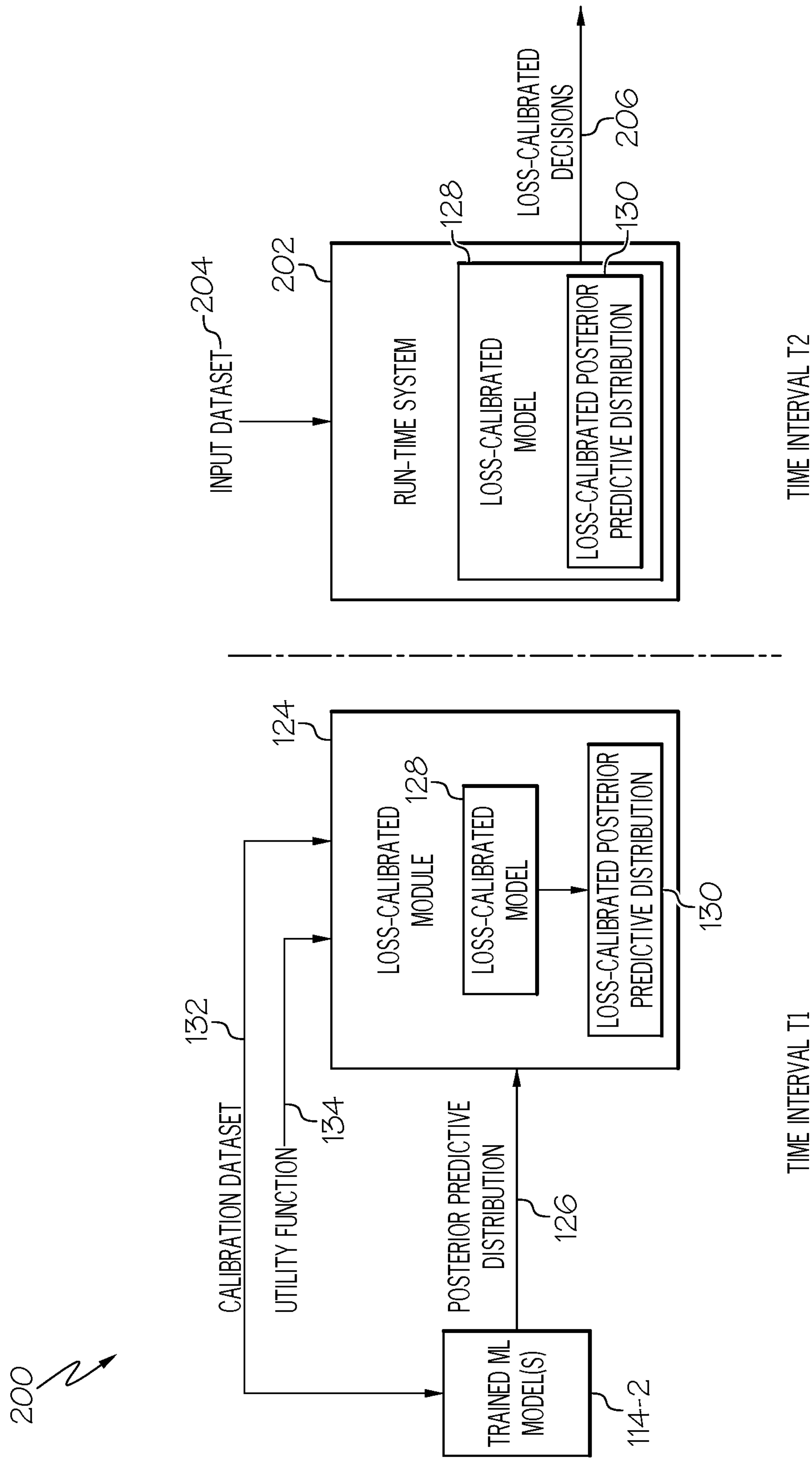
FIG. 2 is a high-level functional diagram of the machine learning model loss-calibration system in accordance with at least some embodiments.

FIG. 2 shows a high-level functional diagram of a post-hoc loss-calibration system 200 of one or more embodiments. During time interval T1, the loss-calibration module 124 trains and configures a loss-calibrated model 128 based on the (original) posterior predictive distribution 126 of the trained model 114-2, a calibration data 132, and a user-defined utility function 134. In at least some embodiments, the loss-calibration module 124 performs a number of training iterations for the loss-calibrated model 128. During training, the loss-calibration module 124 inputs the calibration data 132 (or a subset thereof) into each of the trained ML model 114-2 and the loss-calibrated model 128 to be trained. In one example, the calibration data 132 is data without labels and is independent of calibration/validation datasets 118 used to train the ML model 114-2. In at least some embodiments, the calibration data 132 (or a subset thereof) inputted into the trained ML model 114-2 is the same as the calibration data 118 (or a subset thereof) inputted into the loss-calibrated model 128.

The trained ML model 114-2 and loss-calibrated model 128 each process the calibration data 132 and perform posterior inference operations thereon. For example, given model parameters, such as weights, and the calibration data 132, the trained ML model 114-2 and the loss-calibrated model 128 each learn a respective posterior distribution over their model parameters. The trained ML model 114-2 and the loss-calibrated model 128 then determine and output a respective posterior predictive distribution for the calibration data 132 based on the learned posterior distribution. The parameters (e.g., weights) of the loss-calibrated model 128 are adjusted during each training iteration such that the distance between the original posterior predictive distribution 126 and the loss-calibrated posterior predictive distribution 128 is minimized. Stated differently, parameters of the loss-calibrated model 128 are adjusted during each training iteration until parameters are learned that maximize the probability of the calibration data 132 (or a subset thereof) given those parameters. In addition, the loss-calibration module 124 further optimizes the loss-calibrated model 128 such that the loss-calibrated posterior predictive distribution 128 provides high utility decision on a dataset as governed by the utility function 134. Stated differently, the loss-calibration module 124 configures the loss-calibrated model 128 to optimize a loss-objective that simultaneously maximizes the utility of decisions generated by the loss-calibrated model 128 and maximizes the log-likelihood on an input dataset. After the loss-calibrated model 128 has been trained and optimized, the trained ML model 114-2 is no longer needed. As such, during a subsequent time interval T2, a runtime system 202 implements the loss-calibrated model 128, which takes as input a real-world dataset(s) 204. The loss-calibrated model 128 processes the dataset 204 and outputs final decision/predictions 206 for the dataset 204 based on a loss-calibrated posterior predictive distribution(s) 130 determined by the loss-calibrated model 128.

Post-Hoc Posterior Predictive Corrections

A more detailed description of the loss-calibration process (also referred to as post-hoc posterior predictive correction) performed by the loss-calibration module 124 is now given. As described above, the loss-calibration module 124 takes as input the (original) posterior predictive distributions(s) 128 generated by the trained ML model 114-2, a calibration data(s) 132, and a user-defined utility function 134. The posterior predictive distribution 126 is defined as $p(y_n|x_n, D,\theta^0)$, the calibration data 132 is defined as $$D'\{x_n\}_{n=1}^{N},$$

and the user-defined utility function 134 is defined as $u(c_n,y_n)$ where $c_n$ denotes a decision within a set of possible actions and y denotes model predictions. The loss-calibration module 124 is configured to evaluate a posterior predictive distribution under some approximation to the posterior at all $x_n \in D'$. The log conditional gain on D' is:

$$\log G(h=c|D') = \sum_{n=1}^{N} \log \int_y u(h=c_n, y_n=y)p(y_n=y|x_n, D, \theta^0)dy, \tag{EQ 4}$$

where $c = \{c_n\}_{n=1}^N$, and $c_n = \arg\max_{h\in A} G(h \mid x_n)$.

If the true posterior predictive distribution was accessible, guarantees from Bayesian decision theory ensure that the decisions $c_n$ are optimal. However, for BNNs, the loss-calibration module 124 only has access to potentially crude approximations to the posterior, and $c_n$ are no longer guaranteed to be optimal. The loss-calibration module 124 is configured to address this issue by applying a utility aware correction, defined as $q(y_n|x_n,\lambda)$, to the original (approximate) posterior predictive distribution 126, defined as $p(y_n|x_n,D,\theta^0)$, and evaluated at $x_n \in D'$. The correction is parameterized by a set of learnable parameters, λ. In at least some embodiments, the loss-calibration module 124 implements a neural network to parameterize q, and λ corresponds to the weights of that network. However, other models, such as logistic regression models or latent variable models, are also applicable. The neural network parameterizing q is referred to as the loss-calibrated model 128, and q is referred to as the loss-calibrated posterior prediction distribution 128. The log conditional gain can be expressed as a function of λ:

$$\log G(h=c|D';\lambda) = \sum_{n=1}^{N} \log \mathbb{E}_{q(y_n=y|x_n,\lambda)}\left[\frac{p(y_n=y|x_n, D, \theta^0)u(h=c_n, y_n=y)}{q(y_n=y|x_n,\lambda)}\right], \tag{EQ 5}$$

and is lower bounded by, $$U(\lambda, c; D') = \sum_{n=1}^{N} \mathbb{E}_{q(y_n|x_n,\lambda)}[\log u(c_n, y_n)] - KL(q(y_n \mid x_n, \lambda) \| p(y_n \mid x_n, D, \theta^0)), \tag{EQ 6}$$

where the bound $\log G(h=c|D';\lambda) \geq U(\lambda,c;D')$ follows from Jensen's inequality (see Appendix A.1 below for a detailed derivation). U denotes the objective function to be optimized for learning the loss-calibrated model 128. The lower bound has an intuitive interpretation, the first term guides loss-calibrated posterior predictive distribution 130, $q(\cdot|\cdot,\lambda)$, to higher utility decisions while the second Kullback-Leibler (KL) divergence term encourages the loss-calibrated posterior predictive distribution 130, $q(\cdot|\cdot,\lambda)$, to be close to the original posterior predictive distribution 126 in the KL sense.

The loss-calibration module 124 configures the loss-calibrated model 128 to learn the correction 130, $q(\cdot|\cdot,\lambda)$, by maximizing the objective function, U, with respect to λ and c. The post-hoc loss correction technique performed by the loss-calibration module 124 proceeds in a coordinate ascent fashion by alternating between fixing c and taking a gradient step in the direction maximizing U with respect to λ, and then fixing λ and maximizing c. Regarding finite discrete-valued decision problems prevalent in classification settings, the loss-calibration module 124 is able to maximize c given λ by enumerating the expected utility of all decisions and selecting the highest utility decision.

In at least some embodiments, the techniques performed by the loss-calibration module 124 address computational and other challenges associated with large Bayesian models, such as BNNs. Regarding computational challenges, posterior predictive distributions for BNNs are typically approximated via techniques such as Monte Carlo simulations. Computation and storage costs of Monte Carlo approximations grow linearly with the number of samples and can be prohibitive for large networks. Another challenge stems from user preferences typically being expressed as cost functions [4, 22] rather than utility functions.

In at least some embodiments, the loss-calibration module 124 overcomes computational concerns associated with Monte Carlo approximations to the posterior predictive distribution by configuring the loss-calibrated model 128 to learn an amortized approximation [3, 35]. For example, the loss-calibration module 124 implements the online distillation algorithm [3], which is a special case of the general framework of [35], and distills the posterior predictive distribution into a single "student" neural network model. This technique minimizes the Kullback-Leibler (KL) divergence between $p(y_n|x_n,D,\theta^0)$, which is the original posterior predictive distribution 126 generated by the trained ML model 114-2, and a student network $S(y_n|x_n,\omega)$, parameterized by ω for $x_n \in D'$. The online nature of this technique allows the loss-calibration module 124 to amortize the computation of posterior predictive distribution without having to instantiate a large number of posterior samples. Once the loss-calibration module 124 has trained the student model, the loss-calibration module 124 uses the student model as a drop-in replacement for the original posterior predictive distribution in EQ 6:

$$U^s(\lambda, c, D') = \sum_{n=1}^{N} \mathbb{E}_{q(y_n|x_n,\lambda)}[\log u(c_n, y_n)] - KL(q(y_n \mid x_n, \lambda) \| S(y_n \mid x_n, \omega)). \tag{EQ 7}$$

In practical applications, it is common to have user preferences encoded as decision costs rather than utilities. As such, the loss-calibration module 124, in at least some embodiments, translates between costs and utilities. The decision cost function can be denoted as $\ell(h,y)$, where h again denotes the decision and y denotes the predicted class. The utility function can be rewritten as $u(h,y)=M-\ell(h,y)$, where M is a non-negative real number and is greater than or equal to the supremum of the loss function, $M \geq \sup_{h,y} \ell(h,y)$. By substituting this in EQ 6, the following is obtained:

$$\mathcal{L}(\lambda, c; D') = \sum_{n=1}^{N} \mathbb{E}_{q(y_n|x_n,\lambda)}[\log(M - \ell(c_n, y))] - KL(q(y_n \mid x_n, \lambda) \| p(y_n \mid x_n, D, \theta^0)), \tag{EQ 8}$$

and the analogous amortized variant is given by, $$\mathcal{L}^s(\lambda, c; D') = \sum_{n=1}^{N} \mathbb{E}_{q(y_n|x_n,\lambda)}[\log(M - \ell(c_n, y))] - KL(q(y_n \mid x_n, \lambda) \| S(y_n \mid x_n, \omega)). \tag{EQ 9}$$

Further performing a first-order Taylor series expansion about M [22, 23], the following is obtained:

$$\mathcal{L}^s(\lambda, c; D') \approx \sum_{n=1}^{N} \mathbb{E}_{q(y_n|x_n,\lambda)}\left[\log M - \frac{\ell(c_n, y)}{M}\right] - KL(q(y_n|x_n, \lambda)\|S(y_n|x_n, \omega)). \quad \text{(EQ 10)}$$

Noting that $\mathbb{E}_{q(y_n|x_n;\lambda)}[\log M]$ is constant with respect to λ and c, the following is arrived at, $$\tilde{\mathcal{L}}^s(\lambda, c; D') = -\sum_{n=1}^{N} \mathbb{E}_{q(y_n|x_n,\lambda)}\left[\frac{\ell(c_n, y)}{M}\right] - KL(q(y_n|x_n, \lambda)\|S(y_n|x_n, \omega)). \quad \text{(EQ 11)}$$

If access is available to the original posterior predictive distribution 126, $p(y_n|x_n,D,\theta^0)$), the analogous objective is, $$\tilde{\mathcal{L}}(\lambda, c; D') = -\sum_{n=1}^{N} \mathbb{E}_{q(y_n|x_n,\lambda)}\left[\frac{\ell(c_n, y)}{M}\right] - KL\big(q(y_n|x_n, \lambda)\|p(y_n|x_n, D, \theta^0)\big)). \quad \text{(EQ 12)}$$

As such, after the loss calibrated model 128 has been trained and optimized based on the original posterior predictive distribution 126 ($p(y_n|x_n,D,\theta^0)$) or its amortized version ($S(y_n|x_n,\omega)$), the calibration data $$132\big(D'\{x_n\}_{n=1}^{N}\big),$$

and the utility function 134 $u(c_n,y_n)$, the loss calibrated model 128 determines a loss-calibrated posterior predictive distribution 130 that reaches a local optima of either $\tilde{\mathcal{L}}^s(\lambda, c;D')$ or $\tilde{\mathcal{L}}(\lambda,c;D')$ depending on the current configuration.

FIG. 3 shows one example of pseudo-code 300 for loss-calibration technique performed by the loss-calibration module 124 described above. In this example, lines 1 and 2 define the inputs for the loss-calibration module 124, such as an amortized approximation, $S(\cdot|\cdot,\omega)$, for the posterior predictive distribution generated by the trained ML model 114-2, a calibration data D', a minibatch size B, a loss-calibrated model $q(\cdot|\cdot,\lambda)$ to be trained, a number of training iterations T to be performed, an initialization for the loss-calibrated model $\lambda_0$, and the supremum of the loss function M. At line 3, the parameters of the loss-calibrated model q are initialized to $\lambda_0$. At line 4, one of the T iterations begins. At line 5, the loss-calibration module 124 draws a minibatch size B from the calibration data D'. At lines 6 to 8, the loss-calibration module 124 computes the log of the loss function $\ell$, under the loss-calibrated model q and determines a decision $c_b$ that minimizes a particular log function $\ell$, where $c_b$ ranges over all data points in the minibatch. At line 9, the loss-calibration module 124 minimizes a loss-objective function $\tilde{\mathcal{L}}$. In this example, the loss-objective function $\tilde{\mathcal{L}}$ has two quantities, $$\Sigma_{b=1}^{B}\mathbb{E}_{q(y_b|x_b,\lambda)}\left[\frac{\ell(c_b, y_b)}{M}\right] \quad (1)$$

and (2) $KL(q(y_b|x_b,\lambda)\|S(y_b|x_b,\omega)))$. The first quantity (1) measures how much weight the loss-calibrated model q places on high-utility or low-loss low-cost decisions. The second quantity (2) measures the similarity between the predictions of the loss-calibrated model q and the original trained ML model 114-2. At line 10, the loss-calibration module 124 performs a gradient step in the direction of minimizing the objective $\tilde{\mathcal{L}}$. This process is repeated for the remaining iterations of the T. At line 11, the iteration loop is exited after the last iteration has been performed. At line 12, the loss-calibration module 124 sets the parameters $\lambda_T$ that have been learned to λ in the loss-calibrated model q.

The loss-calibration technique described above has many advantages. For example, the loss-calibration technique evaluates either an original posterior predictive distribution or an amortized approximation to it on a calibration data D'. The loss-calibration techniques are agnostic and do not make any assumptions about how the posterior or the posterior predictive distributions were computed. Moreover, learning the corrections, $q(\cdot|\cdot,\lambda)$, involves optimizing EQ 11 or EQ 12 and is no more expensive than training standard deep neural networks. Finally, at a test point $x_*$ the expected cost associated with a decision h is $$\sum_{k=1}^{C}\ell$$

$(h,y=k)q(y=k|x_*,\lambda)$. Computing this expected cost involves a single forward pass through the loss-calibrated model q. As such, the techniques described herein amortize test time decision-making. This leads to significant speed-ups over existing loss-calibrated inference approaches, which must first compute the posterior predictive distribution by performing an expensive Monte Carlo integration over the corrected posterior before making decisions. Test time amortization allows the techniques of one or more embodiments to be used in applications that demand real-time decision-making. Various experiments were performed implementing the techniques described herein and various competing techniques. These experiments demonstrated that the techniques of one or more embodiments consistently improve the quality of decisions over competing techniques when used in conjunction with BNN inference algorithms implemented by the experiments, such as black-box variational inference (BBVI) [5], stochastic gradient Hamiltonian Monte-Carlo (SGHMC) [8], and Kronecker-factored Laplace approximation (KFAC-Laplace) [31]. Details of these experiments can be found in reference [39] listed in the information disclosure statement (IDS) filed herewith and is incorporated by reference in its entirety.

Overall Flow

Figure 4:
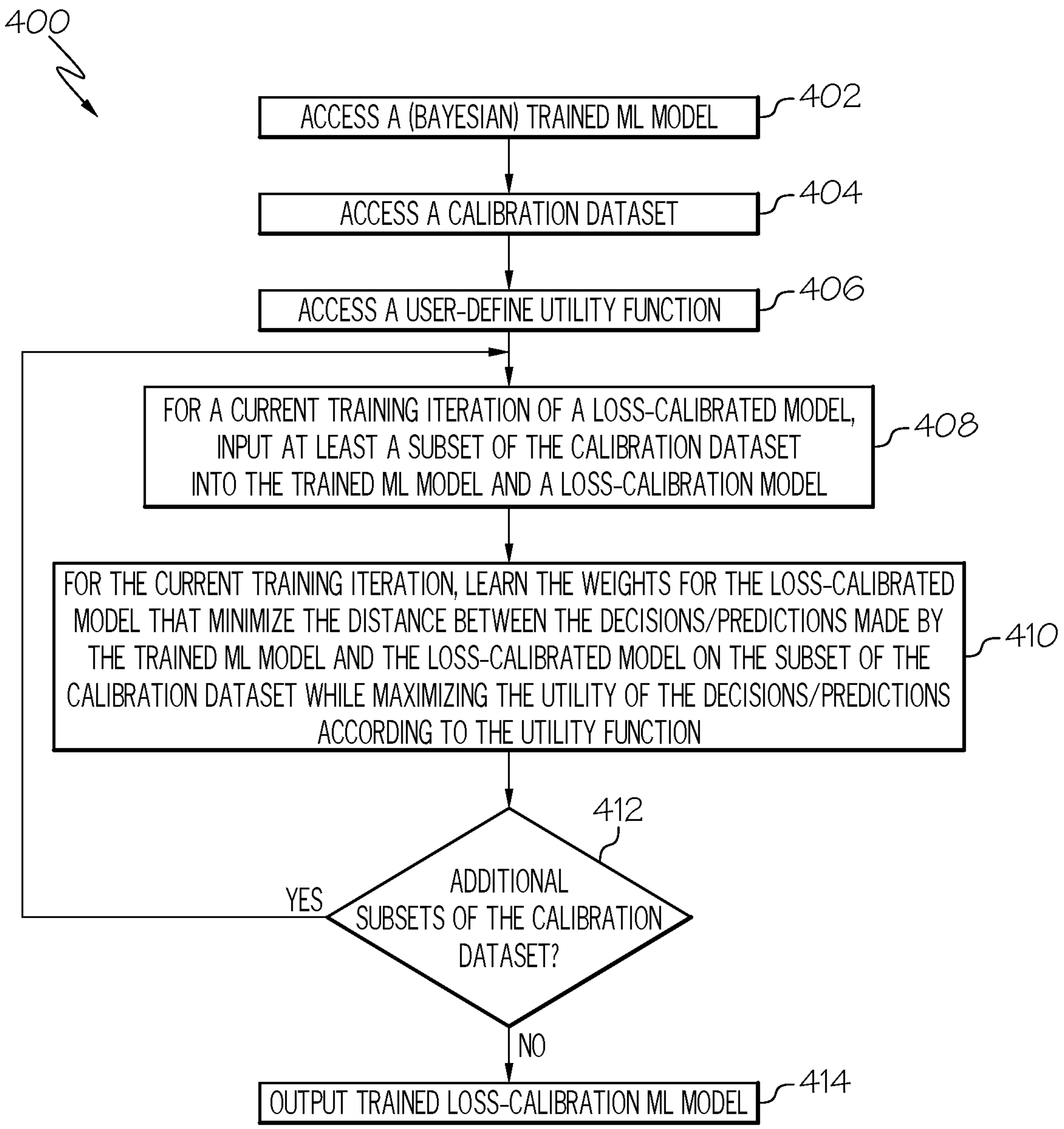
FIG. 4 is an operational flow diagram illustrating a machine learning loss-calibration technique in accordance with at least some embodiments.

FIG. 4 is an operational flow diagram illustrating an overall flow of the machine learning loss-calibration techniques described above in accordance with at least some embodiments. The loss-calibration module 124, at block 402, accesses an ML model 114-2 trained using Bayesian inference. At block 404, a calibration data 132 for training a loss-calibrated model 128 is accessed by the loss-calibration module 124. The loss-calibration module 124, at block 406, also accesses a user-defined utility 134 function that ascribes a utility value to each action from a prescribed set of actions.

Then, for a current training iteration at block 408, the loss-calibration module 124 inputs at least a subset of the calibration data 132 into the trained ML model 114-2 and the loss-calibrated model 128. For the current training iteration at block 410, the loss-calibrated model 128 learns parameters (e.g., weights) that maximize the loss-objective function of either EQ 11 or EQ 12 for the input calibration data subset depending on whether the original posterior predictive distribution 126 of the trained ML model 114-2 is available or an amortized approximation of the original posterior predictive distribution 126 is available. Stated differently, the loss-calibrated model 128 learns the parameters that minimize the distance between decisions/predictions (i.e., posterior predictive distributions 126) made by the trained ML model 114-2 and the loss-calibrated model 128 based on the input calibration data subset while concurrently maximizing the utility of the decisions/predictions according to the utility function 134. The loss-calibration module 124, at block 412, determines if additional subsets of the calibration data 132 remain. If so, the flow returns to block 408, where a new training iteration begins with a new subset of the calibration data 132. If no calibration data 132 remains for training, the loss-calibration module 124, at block 414, outputs the final loss-calibrated model 128. At this point, the final loss-calibrated model 128 can be implemented by one or more runtime systems or environments to process input data 204 and produce loss-calibrated decisions based thereon.

Example Computer System

Figure 5:
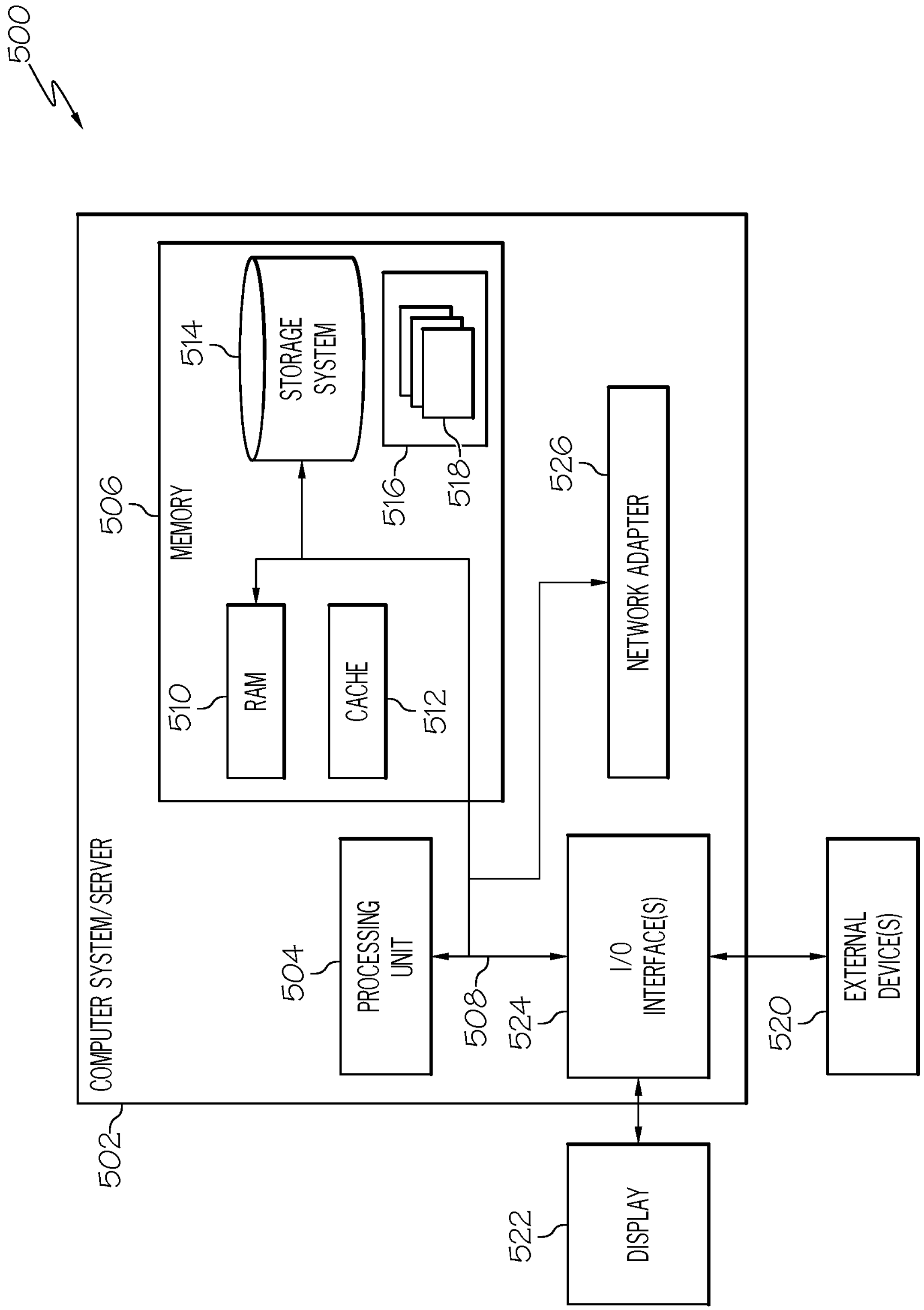
FIG. 5 is a block diagram illustrating one example of an information processing system in accordance with at least some embodiments.

FIG. 5 shows a block diagram illustrating one example of information processing system 502, such as system 102 or system 104 described above. The information processing system 502 is capable of implementing the ML model training system 108, the loss-calibration system 122, or a combination thereof described above. Any suitably configured processing system can be used as the information processing system 502 in embodiments of the present disclosure. In another embodiment, the information processing system 502 is a special-purpose information processing system configured to perform one or more embodiments discussed above. The components of the information processing system 502 can include, but are not limited to, one or more processors or processing units 504, a system memory 506, and a bus 508 that couples various system components, including the system memory 506 to the processor 504.

The bus 508 represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 506 can also include computer system readable media in the form of volatile memory, such as random access memory (RAM) 510 and/or cache memory 512. The information processing system 502 can further include other removable/non-removable, volatile/non-volatile computer system storage media. By way of example only, a storage system 514 can be provided for reading from and writing to a non-removable or removable, non-volatile media such as one or more solid-state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to the bus 508 by one or more data media interfaces. The memory 506 can include at least one program product having a set of program modules configured to carry out the functions of various examples described above.

Program/utility 516, having a set of program modules 518, may be stored in memory 506 by way of example, and not limitation, as well as an operating system, one or more application programs, other program modules, and program data. Each of the operating system, one or more application programs, other program modules, and program data or some combination thereof may include an implementation of a networking environment. In at least some embodiments, the program modules 518 generally carry out the functions and/or methodologies of the above-described processes and systems.

The information processing system 502 can also communicate with one or more external devices 520 such as a keyboard, a pointing device, a display 522, and the like. The information processing system 502 is further able to communicate with one or more devices that enable a user to interact with the information processing system 502; and/or any devices (e.g., network card, modem, etc.) that enable computer system/server 502 to communicate with one or more other computing devices. Such communication can occur via I/O interfaces 524. Still yet, the information processing system 502 can communicate with one or more networks such as a local area network (LAN), a general wide area network (WAN), and/or a public network (e.g., the Internet) via network adapter 526. As depicted, the network adapter 526 communicates with the other components of information processing system 502 via the bus 508. Other hardware and/or software components can also be used in conjunction with the information processing system 502. Examples include, but are not limited to: microcode, device drivers, redundant processing units, external disk drive arrays, RAID systems, tape drives, and data archival storage systems.

APPENDIX A.1

In at least some embodiments, the derivation of the post-hoc correction objective described above begins with the definition of log conditional gain as follows:

$$\begin{aligned}\log g(h=c \mid D'; \lambda) &= \sum_{n=1}^{N} \log \int_y \left(u(h=c_n, y_n=y) q(y_n=y \mid x_n, \lambda) \times \frac{p(y_n=y \mid x_n, D, \theta^0)}{q(y_n=y \mid x_n, \lambda)} dy\right) \\ &= \sum_{n=1}^{N} \log \int_y \left(q(y_n=y \mid x_n, \lambda) \times \left(\frac{p(y_n=y \mid x_n, D, \theta^0) u(h=c_n, y_n=y)}{q(y_n=y \mid x_n, \lambda)}\right)\right) dy \\ &= \sum_{n=1}^{N} \log \mathbb{E}_{q(y_n=y \mid x_n, \lambda)} \left[\frac{p(y_n=y \mid x_n, D, \theta^0) u(h=c_n, y_n=y)}{q(y_n=y \mid x_n, \lambda)}\right]\end{aligned}$$

Now, using Jensen's inequality, the following is obtained:

$$\log g(h=c \mid X) \geq \tag{EQ 13}$$

-continued $$\sum_{n=1}^{N} \mathbb{E}_{q(y_n|x_n,\lambda)}\left[\log\left(\frac{p(y_n \mid x_n, D, \theta^0)u(c_n, y_n)}{q(y)_n \mid x_n, \lambda)}\right)\right] = \sum_{n=1}^{N} \mathbb{E}_{q(y_n|x_n,\lambda)}[\log u(c_n, y_n)] - KL\left(q(y_n \mid x_n, \lambda)\middle\|p(y_n \mid x_n, D, \theta^0)\right) := U(\lambda, c; D').$$

NON-LIMITING EXAMPLES

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, although do not preclude the presence or addition of one or more other features, integers, steps, operations, elements, components, and/or groups thereof. The terms "at least one of A and B" or "at least one of A or B" mean A alone, B alone, or A and B.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described to best explain the principles of the invention and the practical application and enable others of ordinary skill in the art to understand various embodiments of the present invention, with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of using a computing device for post-hoc correction of a decision generated by a machine learning model, the method comprising:

accessing, by the computing device, a trained first machine learning (ML) model, a first dataset, and a utility function over a prescribed set of actions;

training, by the computing device, a second ML model by iteratively:

causing the first dataset to be input into the first ML model, causing the first dataset to be input into the second ML model, receiving a first posterior predictive distribution for the first dataset from the first ML model based at least in part on a learned posterior distribution, receiving a second posterior predictive distribution for the first dataset from the second ML model based at least in part on the learned posterior distribution, causing a distance between the first posterior predictive distribution and the second posterior predictive distribution to be reduced by modifying weights of the second ML model, and in response to the distance between the first posterior predictive distribution and the second posterior predictive distribution falling below a threshold, designating the second posterior predictive distribution as a loss-calibrated posterior predictive distribution; and outputting, by the computing device, the second ML model as a loss-calibrated ML model.

2. The method of claim 1, further comprising:

causing a second dataset to be input into the loss-calibrated ML model; and receiving a set of decisions and/or predictions for the second dataset, wherein the set of decisions and/or predictions are generated by the loss-calibrated model.

3. The method of claim 1, wherein the first ML model and the second ML model are both trained using Bayesian inference, wherein a same subset of the first dataset is input into the first ML model and the second ML model during respective iterations of training the second ML model.

4. The method of claim 1, wherein the first dataset includes calibration data without labels and is independent of any data used to train the first ML model.

5. The method of claim 4, further comprising:

replacing the first posterior predictive distribution with an amortized approximation of the first posterior predictive distribution.

6. The method of claim 1, wherein modifying the weights of the second ML model includes:

processing the first posterior predictive distribution with respect to the second posterior predictive distribution, by determining a Kullback-Leibler (KL) divergence between the first posterior predictive distribution with respect to the second posterior predictive distribution; and determining a set of weights for the second ML model that maximizes utility of the second posterior predictive distribution according to the utility function and minimizes the KL divergence between the first posterior predictive distribution with respect to the second posterior predictive distribution.

7. The method of claim 1, further comprising:

configuring the second ML model with parameters that optimize a loss-objective function by:

in a coordinate ascent fashion, alternating between fixing a decision in the second posterior predictive distribution and taking a gradient step in a direction maximizing the utility function with respect to a given parameter, and then fixing the parameter maximizing the decision, wherein the decision is maximized by enumerating an expected utility of all decisions and selecting a decision with a highest utility according to the utility function.

8. An information processing system for post-hoc correction of a decision generated by a machine learning model, the information processing system comprising:

a memory having program instructions embodied therewith;

a processor communicatively coupled to the memory, wherein the program instructions are executable by the processor to cause the processor to perform a method comprising:

accessing a trained first machine learning (ML) model, a first dataset, and a utility function over a prescribed set of actions;

training a second ML model by iteratively:

causing the first dataset to be input into the first ML model, causing the first dataset to be input into the second ML model, receiving a first posterior predictive distribution for the first dataset from the first ML model based at least in part on a learned posterior distribution, receiving a second posterior predictive distribution for the first dataset from the second ML model based at least in part on the learned posterior distribution, causing a distance between the first posterior predictive distribution and the second posterior predictive distribution to be reduced by modifying weights of the second ML model, and in response to the distance between the first posterior predictive distribution and the second posterior predictive distribution falling below a threshold, designating the second posterior predictive distribution as a loss-calibrated posterior predictive distribution; and outputting the second ML model as a loss-calibrated ML model.

9. The information processing system of claim 8, wherein the method executed by the processor further comprises:

processing the first posterior predictive distribution with respect to the second posterior predictive distribution by determining a Kullback-Leibler (KL) divergence between the first posterior predictive distribution with respect to the second posterior predictive distribution; and configuring the second ML model with parameters by determining a set of weights for the second ML model that maximizes utility of the second posterior predictive distribution according to the utility function and minimizes the KL divergence between the first posterior predictive distribution with respect to the second posterior predictive distribution.

10. The information processing system of claim 8, wherein the method executed by the processor further comprises:

configuring the second ML model with parameters that optimize a loss-objective function by:

in a coordinate ascent fashion, alternating between fixing a decision in the second posterior predictive distribution and taking a gradient step in a direction maximizing the utility function with respect to a given parameter, and then fixing the parameter maximizing the decision, wherein the decision is maximized by enumerating an expected utility of all decisions and selecting a decision with a highest utility.

11. A computer program product for post-hoc correction of a decision generated by a machine learning model, the computer program product comprising a computer-readable storage medium having program instructions embodied thereon, the program instructions executable by a computing device to cause the computing device to:

access a trained first machine learning (ML) model, a first dataset, and a utility function over a prescribed set of actions;

train a second ML model by iteratively:

causing the first dataset to be input into the first ML model, causing the first dataset to be input into the second ML model, receiving a first posterior predictive distribution for the first dataset from the first ML model based at least in part on a learned posterior distribution, receiving a second posterior predictive distribution for the first dataset from the second ML model based at least in part on the learned posterior distribution, causing a distance between the first posterior predictive distribution and the second posterior predictive distribution to be reduced by modifying weights of the second ML model, and in response to the distance between the first posterior predictive distribution and the second posterior predictive distribution falling below a threshold, designating the second posterior predictive distribution as a loss-calibrated posterior predictive distribution; and output the second ML model as a loss-calibrated ML model.

12. The computer program product of claim 11, wherein the first ML model and the second ML model are both trained using Bayesian inference, wherein a same subset of the first dataset is input into the first ML model and the second ML model during respective iterations of training the second ML model.

13. The computer program product of claim 11, wherein modifying the weights of the second ML model includes:

processing the first posterior predictive distribution with respect to the second posterior predictive distribution, by determining a Kullback-Leibler (KL) divergence between the first posterior predictive distribution with respect to the second posterior predictive distribution; and configuring the second ML model with parameters from a set of parameters by determining a set of weights for the second ML model that maximizes utility of the second posterior predictive distribution according to the utility function and minimizes the KL divergence between the first posterior predictive distribution with respect to the second posterior predictive distribution.

14. The computer program product of claim 11, wherein the program instructions cause the computing device to configure the second ML model with parameters that optimize a loss-objective function that concurrently maximizes utility of the second set of decisions according to the utility function and a log-likelihood on the first dataset by:

in a coordinate ascent fashion, alternating between fixing a decision in the second posterior predictive distribution and taking a gradient step in a direction maximizing the utility function with respect to a given parameter in a set of parameters, and then fixing the parameter maximizing the decision, wherein the decision is maximized by enumerating an expected utility of all decisions and selecting a decision with a highest utility.

15. The computer program product of claim 11, wherein the program instructions cause the computing device to:

replace the first posterior predictive distribution with an amortized approximation of the first posterior predictive distribution; and configure the second ML model with parameters that optimize a loss-objective function that concurrently maximizes utility of the second set of decisions according to the utility function and a log-likelihood on the first dataset by:

in a coordinate ascent fashion, alternating between fixing a decision in the second posterior predictive distribution and taking a gradient step in a direction maximizing the utility function with respect to a given parameter in a set of parameters, and then fixing the parameter maximizing the decision, wherein the decision is maximized by enumerating an expected utility of all decisions and selecting a decision with a highest utility, wherein modifying the weights of the second ML model includes:

processing the first posterior predictive distribution with respect to the second posterior predictive distribution, by determining a Kullback-Leibler (KL) divergence between the first posterior predictive distribution with respect to the second posterior predictive distribution, and configuring the second ML model with parameters from a set of parameters by determining a set of weights for the second ML model that maximizes utility of the second posterior predictive distribution according to the utility function and minimizes the KL divergence between the first posterior predictive distribution with respect to the second posterior predictive distribution, wherein the first ML model and the second ML model are both trained using Bayesian inference, wherein a same subset of the first dataset is input into the first ML model and the second ML model during respective iterations of training the second ML model.

* * * * *